United States Patent [19]
Loizeau

[11] Patent Number: 4,549,642
[45] Date of Patent: Oct. 29, 1985

[54] TORSION DAMPERS

[75] Inventor: Pierre Loizeau, Ville D'Avray, France

[73] Assignee: Valeo, Paris, France

[21] Appl. No.: 464,934

[22] Filed: Feb. 8, 1983

[30] Foreign Application Priority Data

Feb. 9, 1982 [FR] France ................ 82 02034

[51] Int. Cl.⁴ .................... F16D 3/66; F16D 3/68
[52] U.S. Cl. ................... 192/106.2; 192/70.17; 192/106.1; 464/68; 464/83; 464/85
[58] Field of Search ........... 192/106.2, 106.1, 70.17; 464/83, 85, 68, 66

[56] References Cited

U.S. PATENT DOCUMENTS

| 2,533,789 | 12/1950 | Goodchild | 64/27 |
| 3,345,831 | 10/1967 | Boole | 464/83 X |
| 3,373,855 | 3/1968 | Ericson | 192/106.2 |
| 3,809,198 | 5/1974 | Mori | 192/106.2 |
| 4,018,320 | 4/1977 | Schrape et al. | 464/68 X |
| 4,156,481 | 5/1979 | Ishida et al. | 192/106 |

FOREIGN PATENT DOCUMENTS

| 1511698 | 2/1968 | France . | |
| 274654 | 5/1930 | Italy | 464/85 |
| 715512 | 9/1954 | United Kingdom . | |

Primary Examiner—Rodney H. Bonck
Attorney, Agent, or Firm—Charles A. Brown

[57] ABSTRACT

A torsional damper comprises at least two coaxial parts (A, B) mounted to rotate relative to one another. A plurality of elastic members are disposed between these parts (A, B) in the circumferential direction. At least one of these members is formed by a block (10') of elastic material, partially housed without circumferential clearance in an opening (27') in one of the coaxial parts (A, B). It is also partially housed, with circumferential clearance (J'T, J'R), in an opening (28') in the other of the coaxial parts (A, B). The elastic material block (10') has a peg (32T, 32R) of elastic material projecting from it in at least one circumferential direction. The invention is applicable in particular to friction clutch mechanisms for automotive vehicles.

17 Claims, 9 Drawing Figures

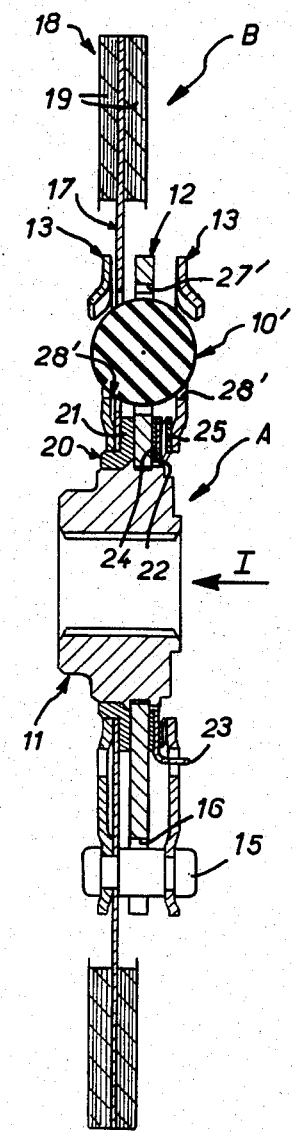
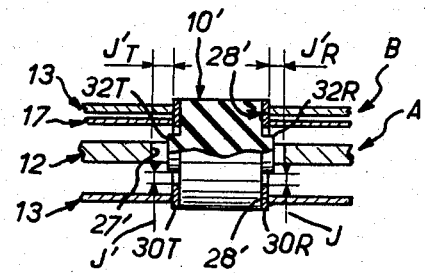
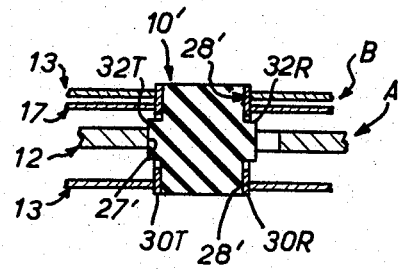
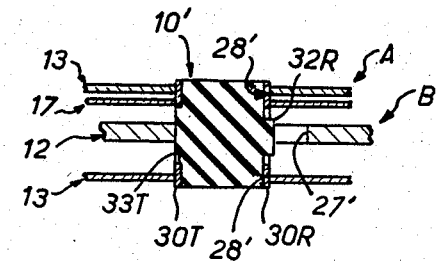
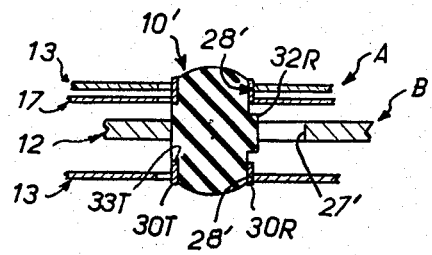
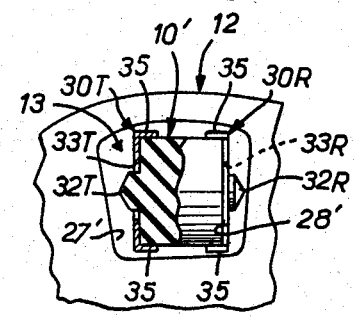
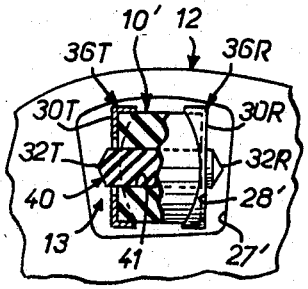

TORSION DAMPERS

BACKGROUND OF THE INVENTION

1. Field of the Invention

The present invention is generally concerned with torsional damper devices comprising at least two coaxial parts mounted to rotate relative to one another within a defined range of relative angular movement against circumferentially acting elastic means.

2. Description of the Prior Art

As is known, this type of torsional damper device is normally incorporated in the design of a friction clutch, particularly for automotive vehicles, for example, in which case one coaxial part comprises a friction disk designed to rotate with a first shaft, in practice a driving shaft and the motor output shaft in the case of an automotive vehicle, constituting a part referred to hereinafter for convenience as the driving part, whereas the other of said coaxial parts is carried on a hub designed to rotate with a second shaft, in practice a driven shaft and the gearbox input shaft in the case of an automotive vehicle, constituting a part referred to hereinafter for convenience as the driven part.

This type of torsional damper device is used to permit regulated transmission of rotational torque applied to one of its coaxial parts where the other is itself subject to a rotational torque, in other words, to filter vibrations which may arise at any point in the kinematic system in which it is incorporated, extending from the motor to the axles in the case of an automotive vehicle.

More often than not, the elastic means disposed in the circumferential direction between the driving part and the driven part comprise a plurality of elastic members extending in a substantially tangential direction relative to a circumference of the damper and all partially housed in an opening formed for this purpose in the driving part and partially housed in an opening also formed for this purpose in the driven part.

Also more often than not, the elastic members utilized are helical springs.

It has previously been proposed to substitute blocks of elastic material for all or some of these springs, however.

Be this as it may, it is common practice to divide the elastic members constituting said elastic means into at least two separate groups and to delay the action of at least one of these groups during relative angular movement between the driving and driven parts, in order to modulate the stiffness of the elastic means operative between the driving and driven parts according to the extent of relative angular movement between them and thus to improve the adaptation of the damper to the specific filtering effect required.

To this end, whereas, in the rest configuration of the damper, all elastic members used are usually disposed without circumferential clearance in the corresponding openings in the driving part, those whose action is to be delayed are, in this rest configuration, disposed with circumferential clearance in the corresponding openings in the driven part, so that they are operative only from the time at which, by virtue of the relative angular movement between the driving and driven parts, this circumferential clearance is absorbed.

However, the stiffness of the elastic means utilized then increases sharply by virtue of the intervention of the second group of elastic members. There sometimes results, when the accelerator pedal of the vehicle is pressed, at least in some specific embodiments, the generation of a noise commonly referred to as a "clunk", whether in motion or stopped. Also, on reversal of the torque between the driving part and the driven part, due to momentary releasing of the accelerator pedal of the vehicle, for example, whether in motion or stopped, there sometimes develops an oscillation phenomenon, the driving part being then subject to very fast retrograde movement followed possibly by it bouncing off the driven part, due to the relatively low stiffness of the first group of elastic members, being the only ones operative at this time.

The noise and oscillation are observed whether the elastic members utilized are springs or blocks of elastic material.

A general objective of the present invention is to provide an arrangement which may be used to reduce or eliminate this noise and oscillation, by ensuring a more progressive changeover from the stiffness of the elastic means disposed between the driving and driven parts when only the first group of elastic members constitutes same and the stiffness of the latter when the second group of elastic members acts in addition to the first.

SUMMARY OF THE INVENTION

The present invention consists in a torsional damper comprising at least two coaxial parts mounted so as to be rotatable relative to one another within predetermined limits of relative angular movement, a plurality of elastic members extending in a substantially tangential direction relative to a circumference of the damper and disposed between said coaxial parts in the circumferential direction, at least one of said elastic members comprising a block of elastic material partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said elastic material block has at least one elastic material peg projecting from it in said first circumferential direction.

Projecting in this way from the associated elastic material block, the elastic material peg comes into action before the latter, on relative angular movement between the coaxial parts concerned, and thereby offers the advantage of a progressive change in the stiffness of the elastic means operative before intervention of the elastic material block.

The noise and oscillation may in this way be minimized or even eliminated.

French Pat. No. 1 511 698 discloses the use of two elastic material blocks, one of less stiffness than the other, each of the elastic members acting in the circumferential direction between the two coaxial parts of a torsional damper device, said blocks being disposed one after the other with a metal base member between them and each being equipped, at its free end, with a metal bearing plate.

Apart from the fact that, in this arrangement, the less stiff block, having a transverse cross-sectional area comparable with that of higher stiffness, does not constitute a peg projecting therefrom in the sense of the present disclosure, and that, as opposed to the present disclosure, it is in practice applicable to the case where the elastic members are disposed without circumferential clearance in the corresponding openings in the coaxial part concerned, for the rest configuration of the damper, this arrangement is not of a kind to minimize noise in particular, because of the metal on metal impact between the hub disk and the elastic material block bearing plate, especially on reversal of the torque between the driving part and the driven part.

Also, the utilization of the block of lower stiffness requires the utilization of a specific additional member, in the form of a metal bush integral with the corresponding metal plate and adapted so that its edge come into abutment against the metal base member separating the block of lower stiffness from the block of greater stiffness with which it is associated.

This does not apply to the projecting pegs utilized in accordance with the invention, the free end of which is uncovered, having no bearing plate, and which extends cantilever fashion from the associated elastic material block, being supported directly thereby.

It therefore appears that the invention has challenged the previously adopted attitude that when a metal member, in this instance the hub disk, acts on an elastic material member, the latter must necessarily be protected by a bearing plate.

As the elastic material member is operative only temporarily, at relatively low torque, experience has shown that, in a manner which is surprising in the final analysis, the use of a bearing plate, which inevitably generates noise, may be dispensed with.

Finally, the less stiff block disclosed in French Pat. No. 1 511 698 itself participates in retaining the higher stiffness block in position in the corresponding openings in the coaxial parts concerned.

As a result, on the one hand, the less stiff block must have minimal transverse dimensions to avoid uncertain positioning of the higher stiffness block, especially at high speeds, by virtue of centrifugal force, and, on the other hand, it can extend in the circumferential direction on one side only, in practice that side corresponding to operation of the damper with decreasing torque.

As opposed to this, the pegs in accordance with the invention projecting from the associated elastic material blocks play no part in positioning the blocks and can therefore have any transverse dimensions, as small as required, and can extend in the circumferential direction on either side of the elastic material block, to operate equally well with increasing torque on the one hand and decreasing torque on the other.

In the limiting case, the projecting pegs in accordance with the invention may fail without the operation of the damper being effectively compromised in its essentials.

This is not the case with the less stiff blocks disclosed in French Pat. No. 1 511 698.

U.S. Pat. No. 2,533,789 describes a torsional damper device in which the elastic members are blocks of elastic material each comprising a peg of elastic material projecting from it in each circumferential direction.

However, in the disclosure of this U.S. Pat. No. 2,533,789, these elastic material blocks are disposed without circumferential clearance in the corresponding openings in both the coaxial parts concerned, so that they come into action as soon as relative angular movement between these begins.

The problems of noise and oscillation to which the elastic material pegs in accordance with the invention constitute a solution do not exist in this prior art torsional damper device, but this is at the cost of there being no progressive change in the stiffness of the elastic means disposed between the two coaxial parts thereof.

In reality, the elastic material pegs disclosed in U.S. Pat. No. 2,533,789 exist only to center the distribution plates provided at the corresponding circumferential ends of the elastic material blocks carrying same. They do not extend beyond these plates, and thus are unable to act before the blocks.

As opposed to this, in the present disclosure, when such plates are provided, which is the usual case in practice, the elastic material peg or pegs utilized extend beyond them in the circumferential direction so as to act before the corresponding elastic material blocks.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a view of the device in axial cross-section on the line II—II in FIG. 2.

FIG. 3.is a partial view of the device in circumferential cross-section on the line III—III in FIG. 1, in a rest configuration.

FIGS. 4A, 4B, and 4C are views analogous to that of FIG. 3 and showing respective stages in the operation of the torsional damper device in accordance with the invention.

FIGS. 6 and 7 are partial views corresponding to FIG. 1, showing respective alternative embodiments.

DESCRIPTION OF THE PREFERRED EMBODIMENTS

Figure 1:
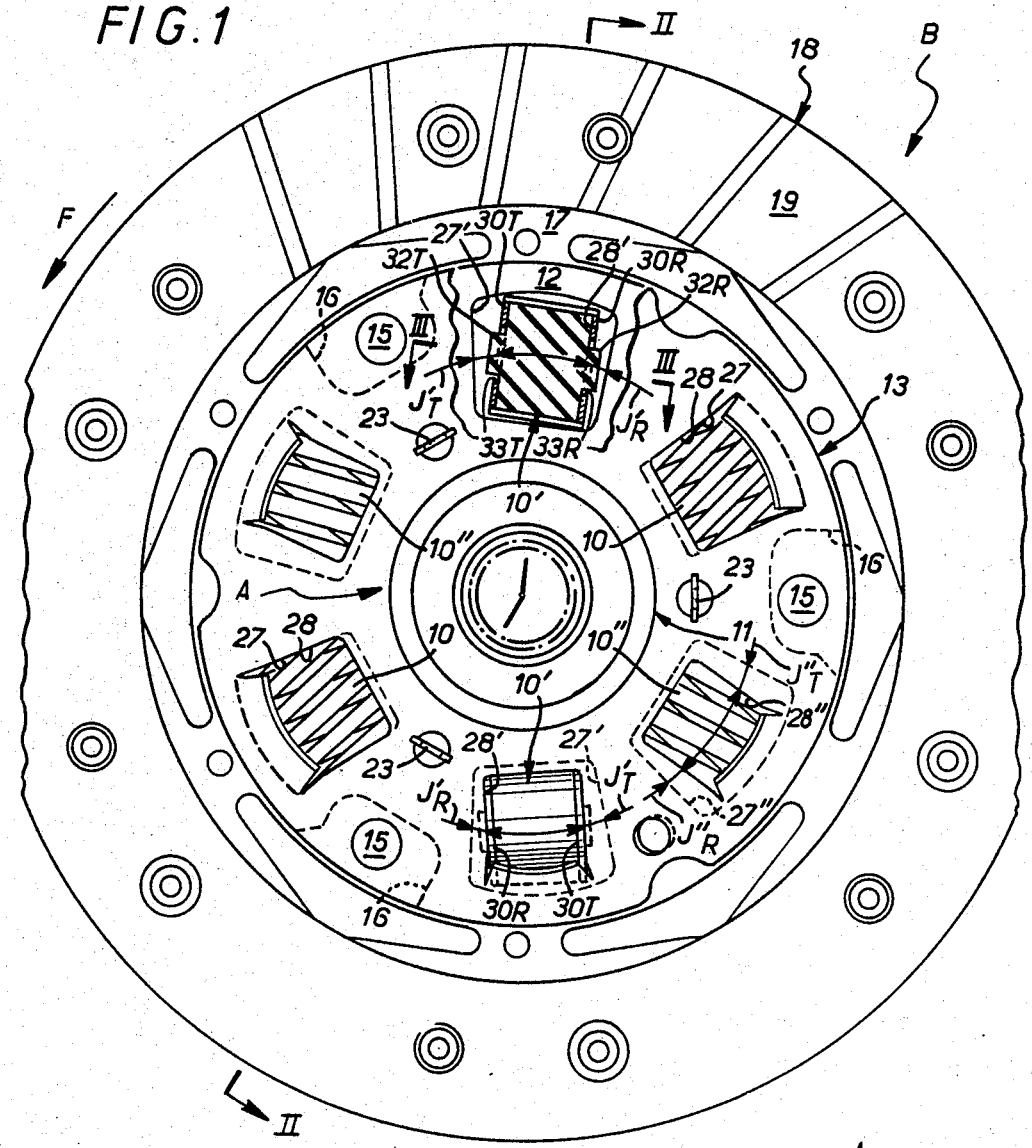
FIG. 1 is a partial view in elevation and partially cutaway of a torsional damper device in accordance with the invention, seen in the direction of arrow I in FIG. 2.

As shown in these figures, which illustrate by way of example the application of the invention to the construction of a damper hub type friction clutch for automotive vehicles, the torsional damper device in accordance with the invention comprises, in a general manner known per se, two coaxial parts A and B mounted so as to be rotatable relative to one another within predetermined limits of relative angular movement, and a plurality of elastic members, to be described in detail hereinafter, disposed circumferentially between said coaxial parts A and B and extending in a substantially tangential direction relative to a circumference of the damper, the same circumference for all springs in the embodiments shown.

Part A, hereinafter referred to for convenience as the "driven" part, comprises, in the embodiments shown, a hub 11 designed to be keyed to rotate with a shaft, in practice a driven shaft, by means of internal splines, for example, as shown here. It further comprises a hub disk 12 which is rigidly attached to hub 11, being crimped to the latter, for example, as shown here.

Part B, hereinafter referred to for convenience as the "driving" part, comprises, in the embodiments shown, two guide rings 13 disposed on respective opposite sides of hub disk 12, parallel thereto and spaced therefrom. They are rigidly attached together by means of spacers 15 which pass with clearance through notches 16 formed for this purpose in the periphery of disk 12.

The driving part B also comprises a friction disk assembly 18 attached by its disk 17 to one of guide rings 13, on the side thereof facing the other guide ring 13, by the same spacers 15 which also attach it to said other guide ring 13. This friction disk assembly is intended to be gripped axially, by means of its friction facings 19, between two plates keyed against rotation to a shaft, in practice a driving shaft.

In the embodiments shown, disk 17 of friction disk assembly 18 is in a single piece. As an alternative, it may be subdivided into vanes.

In the following description, for reasons of simplicity, it will be more often than not be classed in the same category as the guide ring 13 to which it is coupled.

On the side of hub disk 12 facing friction disk assembly 18 there is disposed, between the corresponding guide ring 13 and disk 17 of said friction disk assembly 18, on the internal perimeter of guide ring 13 and disk 17, on the one hand, and hub 11 of the driven part, on the other hand, a bearing 20 attached to which is a radial collar 21 inserted axially between disk 17 of friction disk assembly 18 and hub disk 12.

On the side of hub disk 12 facing the other guide ring 13 are axially inserted, on the one hand, an action ring 22 which is keyed to rotate with guide ring 13 by axial lugs 23 and carries a friction facing 24 in contact with hub disk 12 and, on the other hand, between action ring 22 and guide ring 13, an axially elastic ring 25 of the kind, for example and as shown here, marketed under the commercial designation "ONDUFLEX".

These arrangements are well known per se, and as they do not constitute part of the present invention, will not be described in further detail here.

Also in a manner known per se, the elastic members disposed circumferentially between the driven part A and the driving part B are divided, in the embodiments shown, into two separate groups of elastic members.

There is firstly a first group of elastic members together constituting a first damper stage, of relatively low stiffness.

In the embodiments shown, they are helical springs 10, two in number in these embodiments, disposed in substantially diametrically opposite relationship to one another.

Each of springs 10, is partially housed in an opening 27 formed for this purpose in driven part A, in practice an opening formed in hub disk 12 of the latter, and partially in an opening 28, also formed for this purpose in driving part B, in practice openings formed in guide rings 13 of the latter and in disk 17 of friction disk assembly 18.

In the embodiments shown, and as shown in FIG. 1, in the rest configuration of the damper, springs 10 are disposed without circumferential clearance in openings 27, 28 and axially superposed on one another.

As will become clear hereinafter, it results from this that, on relative angular movement between driving part B and driven part A, springs 10 operate in the same manner.

As an alternative, and in a manner known per se, there may be arranged for each of them a circumferential offset between openings 27, 28, in one direction for one of them and in the opposite direction for the other, so that, being thus mounted in opposition, one is compressed when the other expands and vice versa on relative angular movement between driving part B and driven part A.

In the embodiments shown, the second group of elastic members disposed in the circumferential direction between driving part B and driven part A comprises blocks 10' of elastic material, an elastomer material, for example, and helical springs 10", said elastic material blocks 10' and said springs 10" together constituting a second damper stage of relatively higher stiffness and, in all cases, of significantly higher stiffness than the first damper stage formed by the aforementioned springs 10.

Like springs 10, elastic material blocks 10', of which there are two in the embodiments shown, are disposed in substantially diametrically opposed relationship to one another, each partially housed in an opening 27' formed for this purpose in driven part A, in practice an opening formed in hub disk 12 thereof, and partially in an opening 28' also formed for this purpose in driving part B, in practice an opening formed in guide rings 13 thereof and in disk 17 of friction disk assembly 18.

In the embodiments shown, and as shown in FIGS. 1 and 3 in particular, each of elastic material blocks 10' is, in the rest configuration of the damper, disposed without circumferential clearance in its opening 28' in driving part B and with circumferential clearance in its opening 27' in driven part A, of value J'T for the circumferential direction corresponding to the more frequent direction of rotation of the damper, which is shown by the arrow F in FIG. 1 and corresponds to forward movement of the vehicle concerned, and of value J'R for the opposite circumferential direction.

As measured in the angular sense, these two values J'T and J'R of circumferential clearance may be equal to one another.

In the embodiments shown, however, clearance J'T in the circumferential direction assumed to correspond to operation of the damper with increasing torque is greater than clearance J'R in the opposite circumferential direction, assumed to correspond to operation of the damper with decreasing torque.

In the embodiments shown, elastic material blocks 10' have a circular contour in transverse cross-section, like springs 10, and at each of their circumferential ends, in order to prevent damage and to position them more accurately, there is associated with them a distribution and retaining plate 30T, 30R disposed in the circumferential direction between the aforementioned end and the corresponding edge of the corresponding opening 28' in driving part B.

Like elastic material blocks 10', which they cover at their ends, distribution and retaining plates 30T, 30R in practice have a circular contour.

Like springs 10 and elastic material blocks 10', springs 10", of which there are two in the embodiment shown, disposed in substantially diametrically opposite relationship to one another, alternating with springs 10 and elastic material blocks 10', are each partially housed in an opening 27" formed for this purpose in driven part A, in practice an opening formed in hub disk 12 thereof, and partly in an opening 28" also formed for this purpose in driving part B, in practice an opening formed in guide rings 13 thereof and in disk 17 of friction disk 18.

In the embodiments shown, and as shown in FIG. 1, in the rest configuration of the damper, springs 10" are disposed without circumferential clearance in their openings 28" in driving part B and with circumferential clearance in their openings 27" in driven part A, of value J"'T for the circumferential direction indicated by the arrow F in FIG. 1 and of value J"R for the opposite circumferential direction.

In practice, and as for elastic material blocks 10', circumferential clearance J'T as measured in the angular sense is greater than circumferential clearance J"R.

In practice, in the embodiments shown, the clearances J"T, J"R associated in this way with springs 10" have values respectively greater than circumferential clearances J'T, J'R associated with elastic material blocks 10'.

Other arrangements may naturally be adopted.

Also, since these arrangements are well known per se and do not constitute part of the present invention, they will not be described in further detail here.

In accordance with the invention, at least one of elastic material blocks 10', and in practice each of them in the embodiments shown, has a peg of elastic material projecting in at least a first circumferential direction.

In the embodiments shown, there is a respective elastic material peg for each circumferential direction, 32T for that indicated by arrow F in FIG. 1 and 32R for the opposite circumferential direction.

In the embodiments shown in FIGS. 1 to 6, elastic material pegs 32T, 32R thus associated with an elastic material block 10' are formed in one piece therewith. Be this as it may, they extend in the circumferential direction between distribution and retaining plate 30T, 30R, through which they pass by virtue of apertures 33T, 33R formed for this purpose in the central area thereof.

For preference, and as shown, each elastic material peg 32T, 32R passes with clearance j through aperture 33T, 33R in the corresponding distribution and retaining plate 30T, 30R, and the volume formed by this clearance between elastic material peg 32T, 32R and the wall of passage 33T, 33R is sufficient to accommodate the elastic material peg 32T, 32R when, as will be described hereinafter, it is crushed in the circumferential direction.

In practice, pegs 32T, 32R, the transverse cross-section of which is very much smaller than that of the associated elastic material blocks 10', extend freely cantilever fashion from the central area of the latter, and their free ends are uncovered, in other words without any distribution or protection plate or other covering member.

In the embodiment shown in FIGS. 1 to 4, the free end of each of pegs 32T, 32R is flat and substantially perpendicular to a tangient to the circumference of the damper along which extends the corresponding elastic material block 10'. In the rest configuration of the damper, as shown in FIG. 1, this free end is spaced from the corresponding edge of opening 27' in driven part A in which elastic material block 10' is disposed.

Because of the clearance j between each peg 32T, 32R of an elastic material block 10' and the corresponding aperture 33T, 33R in the corresponding distribution and retaining plate 30T, 30R through which the peg passes, retaining means are provided between elastic material block 10' and each of distribution and retaining plates 30T, 30R associated therewith.

In the embodiment shown in FIGS. 1 to 4, these retaining means consist in the simple attachment, by bonding or gluing, for example, of distribution and retaining plates 30T, 30R to the corresponding elastic material block 10', which may also be vulcanized when in position between them, for example.

It will be noted that, by virtue of their restricted transverse cross-section and their projecting from the central area of the circumferential ends of the associated elastic material blocks 10', pegs 32T, 32R in accordance with the invention do not in any way interfere with the retaining in position of the latter.

OPERATION

When, for the damper rotation direction indicated by arrow F in FIG. 1 and operation of the damper with increasing torque, torque is applied to driving part B, only springs 10 of relatively lower stiffness yield elastically, and do so immediately.

Figure 5:
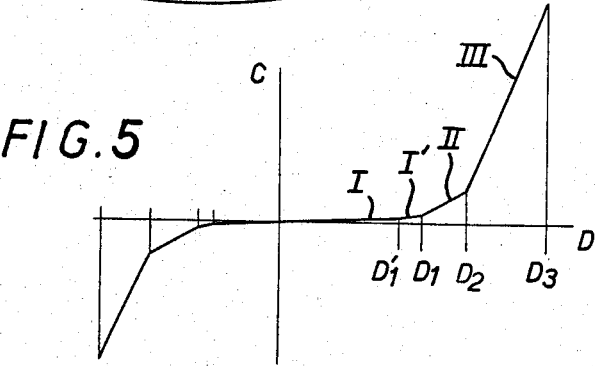
FIG. 5 is a diagram representing this operation.

In the graph shown in FIG. 5, the relative angular movement D between driving part B and driven part A is plotted on the abscissae against the torque C transmitted from one of these parts to the other, plotted along the ordinates. On this graph, this first stage of operation is represented by a straight line I, the slope of which is proportional to the stiffness of springs 10.

Normally, that is to say in the absence of elastic material pegs 32T, 32R in accordance with the invention, this first stage of operation continues until, for a value D1 of relative angular movement D corresponding to absorption of the circumferential clearance J'T associated with elastic material blocks 10', the latter come into action in their turn, their effect being added to that of springs 10, the curve representing the second stage of operation which begins at this time being a straight line II of slope proportional to the stiffness of the assembly, springs 10 remaining compressed.

However, since they project in the circumferential direction from elastic material blocks 10', elastic material pegs 30T associated therewith come into action before them (FIG. 4A) for a value D'1 of relative angular movement D less than the preceding value D1.

Thus on the diagram in FIG. 5, there is a segment I' joining straight lines I and II, its slope being intermediate those of straight lines I and II, offering the advantage of a more progressive changeover between them, corresponding to the action of elastic material pegs 32T in accordance with the invention.

As mentioned hereinabove, and as shown in FIG. 4B, when elastic material pegs 32T are crushed in the circumferential direction, they occupy at least part of the space initially left free for this purpose between them and the wall of aperture 33T through which they pass.

It is only when (FIG. 4B) they come level with the corresponding distribution and retaining plate 30T, at least in line with hub disk 12, that distribution and retaining plates 30T come into contact with the corresponding edge of the corresponding opening 27' in the latter and elastic material blocks 10' in turn come into action, and are themselves subject to crushing in the circumferential direction (FIG. 4C).

The resulting second stage of operation continues until, for a value D2 of relative angular movement D corresponding to absorption of the circumferential clearance J"T associated with springs 10", springs 10" in turn come into action and their effect is added to that of springs 10 and elastic material blocks 10' which, like elastic material pegs 32T, remain compressed conjointly.

In the diagram on FIG. 5, the third phase of operation which begins at this time is represented by a straight line III with slope proportional to the combined stiffness.

This third stage of operation continues until, for a value D3 of relative angular movement D, driven part A is directly driven by driving part B, either because at least some of springs 10, 10" have their turns contiguous or because spacers 15 then come into contact with the corresponding edge of notches 16 in hub disk 12 through which they pass.

For operation of the assembly with reducing torque, the torque between coaxial parts A and B reverses and, after retrograde rotational movement of driving part B relative to driven part A, a process similar to that described previously occurs, it being understood that at this time it is pegs 32R which act.

Thus the assembly comprising elastic material blocks 10' and the associated pegs 32T, 32R in accordance with the invention is advantageously as effective for operation of the torsional damper device with increasing torque as for operation with decreasing torque.

In the foregoing, for reasons of simplification, no account has been taken of the well known hysteresis phenomenon which, due to friction between coaxial parts A and B, results in a difference between the value of the torque transmitted between these coaxial parts A and B for increasing relative angular movement between them as compared with the torque transmitted between these coaxial parts for decreasing relative angular movement.

In the embodiment shown in FIG. 6, at least one of distribution and retaining plates 30T, 30R associated with an elastic material block 10', and in practice with each block, has at least two lugs 35 for retaining elastic material block 10' in position, disposed in substantially diametrically opposite relationship to one another, in line with hub disk 12 and bent circumferentially into contact with elastic material block 10'. For preference, for purposes of cooperation with these lugs 35, elastic material block 10' if formed with flats, this improves its retention and strength.

Also, in this embodiment, the free end of elastic material pegs 32T, 32R associated with an elastic material block 10' is at least partially tapered, the transverse cross-section of elastic material pegs 32T, 32R decreasing, conical fashion, for example, and as shown, in the direction away from elastic material block 10'.

It is thereby possible to modulate the intervention of elastic material pegs 32T, 32R on relative angular movement between driving part B and driven part A and so to further improve the progressive changeover from relatively low stiffness to relatively high stiffness in the elastic means disposed in the circumferential direction between said parts.

In the embodiment shown in FIG. 7, at least one of distribution and retaining plates 30T, 30R associated with an elastic material block 10', and in practice with each such block in the embodiment shown, constitutes the bottom of a cup 36T, 36R in which elastic material block 10' is engaged in order to retain it in position. In practice, and as shown, its edge is at least partially cut away in line with guide rings 13, to avoid any possibility of interference therewith.

Also, in this embodiment, at least one of elastic material pegs 32T, 32R associated with an elastic material block 10', and in practice with each such block in the embodiment shown, is separate from elastic material block 10'.

By virtue of this arrangement, the elastic material of elastic material pegs 32T, 32R may, if required, be different from that of elastic material block 10', and therefore have greater or lesser stiffness than the latter, according to the effect required.

In practice, in the embodiments shown, the two elastic material pegs 32T, 32R associated with an elastic material block 10' constitute the ends of an elastic material rod 40 which is a force-fit in a circumferential hole 41 in elastic material block 10'.

In all cases, and as will have been realized, when each of elastic material pegs 32T, 32R is compressed it offers the advantage of absorbing, by internal friction, part of the torque transmitted between coaxial parts A and B.

It will be understood that various changes in the details, materials and arrangements of parts, which have been herein described and illustrated in order to explain the nature of the invention, may be made by those skilled in the art within the principle and scope of the invention as expressed in the appended claims.

In particular, the thickness of the elastic material pegs, as measured parallel to the axis of the damper assembly, may, if required, and in order to minimize the risk of it being indented by the hub disk, be less than the thickness of the latter.

Also, unlike the arrangement specifically described hereinabove, the elastic members utilized may be disposed without circumferential clearance, in the rest configuration of the damper, in the corresponding openings in the driven part and, in the case of some of them at least, with circumferential clearance in said rest configuration in the corresponding openings in the driving part. It is also the case that, as their functions may be interchanged, these parts have been designated driving part and driven part hereinabove by convention only and for reasons of convenience.

Also, the application of the invention is not limited to torsional damper devices comprising only two coaxial parts mounted rotatably relative to one another, but also covers cases where a torsional damper device of this kind comprises a greater number of coaxial parts mounted to rotate relative to one another in pairs.

Finally, the invention is not limited to friction clutch mechanisms for automotive vehicles, being more generally applicable to any type of torsional damper device.

It is claimed:

1. A torsional damper comprising at least two coaxial parts mounted so as to be rotatable relative to one another within predetermined limits of relative angular movement, a plurality of elastic members extending in a substantially tangential direction relative to a circumference of the damper and disposed between said coaxial parts in a circumferential direction, at least one of said elastic members comprising a block of elastic material partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said elastic material block has at least one elastic material peg projecting therefrom in said first circumferential direction, said peg defining a damping stage operative after a predetermined relative angular displacement of said coaxial parts, the rest of said elastic material block defining a further damping stage operative upon further relative angular displacement of said coaxial parts.

2. A torsional damper according to claim 1, wherein said peg extends freely and in cantilever fashion from the central part of the corresponding circumferential end surface of the associated elastic material block.

3. A torsional damper according to claim 1, wherein said peg has its free end uncovered.

4. A torsional damper according to claim 1, wherein said peg has a transverse cross-section of considerably smaller area than that of the associated elastic material block.

5. A torsional damper according to claim 1, wherein, in said rest configuration of the damper, said elastic material peg has its free end spaced from a corresponding edge of said opening in said coaxial part in which the associated elastic material block is disposed.

6. A torsional damper according to claim 1, wherein said elastic material peg has its free end at least partially tapered, its cross-sectional area decreasing in the direction away from the associated elastic material block.

7. A torsional damper according to claim 1, wherein said elastic material peg is in one piece with the associated elastic material block.

8. A torsional damper according to claim 1, comprising a respective elastic material peg associated with said elastic material block for each circumferential direction.

9. A torsional damper according to claim 1, wherein said elastic members also define a low stiffness damping stage operative for relative angular displacements less than said predetermined relative angular displacement of said coaxial parts.

10. A torsional damper comprising at least two coaxial parts mounted so as to be rotatable relative to one another within predetermined limits of relative angular movement, a plurality of elastic members extending in a substantially tangential direction relative to a circumference of the damper and disposed between said coaxial parts in the circumferential direction, at least one of said elastic members comprising a block of elastic material partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said elastic material block has at least one elastic material peg projecting therefrom in said first circumferential direction, said peg defining a damping stage operative after a predetermined relative angular displacement of said coaxial parts, the rest of said elastic material block defining a further damping stage operative upon further relative angular displacement of said coaxial parts, a plate disposed in the circumferential direction between said elastic material block and the corresponding edge of the opening in said second coaxial part and said elastic material peg passing through an aperture formed for this purpose in said plate and extending beyond said plate in the circumferential direction.

11. A torsional damper according to claim 10, wherein said elastic material peg passes with clearance through said aperture.

12. A torsional damper according to claim 11, wherein the space between said elastic material peg and said aperture is sufficient to accommodate said elastic material peg when crushed in the circumferential direction.

13. A torsional damper according to claim 10, wherein said plate comprises at least two lugs for maintaining it in position on said elastic material block, disposed in substantially diametrically opposite relationship to one another and folded in the circumferential direction into contact with said elastic material block.

14. A torsional damper according to claim 10, comprising a cup member of which said plate constitutes the bottom and in which said elastic material block is engaged.

15. A torsional damper according to claim 14, wherein the edge of said cup member is at least partially cut away.

16. A torsional damper comprising at least two coaxial parts mounted so as to be rotatable relative to one another within predetermined limits of relative angular movement, a plurality of elastic members extending in a substantially tangential direction relative to a circumference of the damper and disposed between said coaxial parts in the circumferential direction, at least one of said elastic members comprising a block of elastic material partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said elastic material block has at least one elastic material peg projecting therefrom in said first circumferential direction, said peg defining a damping stage operative after a predetermined relative angular displacement of said coaxial parts, the rest of said elastic material block defining a further damping stage operative upon further relative angular displacement of said coaxial parts, said elastic material peg being separate from and made from a different elastic material than the associated elastic material block.

17. A torsional damper according to claim 14, comprising a respective elastic material peg associated with said elastic material block for each circumferential direction and wherein said two elastic material pegs associated with said elastic material block comprise the ends of an elastic material rod which is a force-fit in a chordal hole in said elastic material block.

* * * * *